United States Patent
Habibvand

(10) Patent No.: US 7,703,746 B2
(45) Date of Patent: Apr. 27, 2010

(54) GROUND-BASED POWER GENERATOR WITH BALL-ROLLER BEARING BUTTERFLY VALVE

(75) Inventor: Alex Habibvand, Orange, CA (US)

(73) Assignee: Roller Bearing Company of America, Inc., Oxford, CT (US)

(*) Notice: Subject to any disclaimer, the term of this patent is extended or adjusted under 35 U.S.C. 154(b) by 0 days.

(21) Appl. No.: 12/170,738

(22) Filed: Jul. 10, 2008

(65) Prior Publication Data

US 2009/0016658 A1 Jan. 15, 2009

Related U.S. Application Data

(60) Provisional application No. 60/959,326, filed on Jul. 12, 2007.

(51) Int. Cl.
*F16C 19/49* (2006.01)
(52) U.S. Cl. .................. 251/306; 384/454; 384/494
(58) Field of Classification Search ......... 251/305–308; 384/424, 452, 494
See application file for complete search history.

(56) References Cited

U.S. PATENT DOCUMENTS

| 3,388,854 | A | * | 6/1968 | Olofsson et al. ............. 418/203 |
|---|---|---|---|---|
| 3,779,514 | A | * | 12/1973 | O'Connor, Jr. ............... 251/369 |
| 4,244,630 | A | * | 1/1981 | Tischer ........................ 384/494 |
| 4,465,446 | A | * | 8/1984 | Nemit, Jr. et al. ........ 418/201.1 |
| 4,557,679 | A | * | 12/1985 | Mori et al. ................ 418/201.1 |
| 4,749,004 | A | * | 6/1988 | Peash .......................... 137/865 |
| 4,938,452 | A | | 7/1990 | Imamura et al. |
| 5,074,393 | A | * | 12/1991 | Itomi ........................ 384/560 |
| 5,433,305 | A | * | 7/1995 | Takamatsu et al. .......... 384/495 |
| 5,832,099 | A | * | 11/1998 | Wiener ....................... 381/386 |
| 5,887,985 | A | | 3/1999 | Loree, II et al. |
| 5,953,898 | A | | 9/1999 | Dryden |
| 6,705,444 | B2 | * | 3/2004 | Fujiwara et al. ............... 192/45 |
| 6,968,943 | B2 | * | 11/2005 | Kilby et al. ................. 198/852 |
| 2004/0020358 | A1 | * | 2/2004 | Siegel et al. ................... 92/72 |
| 2007/0172165 | A1 | * | 7/2007 | Moller et al. ............... 384/494 |

FOREIGN PATENT DOCUMENTS

| DE | 102004020851 A1 | 11/2005 |
|---|---|---|
| WO | 2005057031 A1 | 6/2005 |

* cited by examiner

*Primary Examiner*—John Bastianelli
(74) *Attorney, Agent, or Firm*—Michaud-Kinney Group LLP

(57) ABSTRACT

A hot gas valving system for a ground-based power generation system includes a gas flow conduit having a wall and defining a path for fluid flow and a butterfly valve located in the wall and transversely across the path for fluid flow. The butterfly valve includes a first raceway defined by an inner ring and an outer ring, a second raceway defined by an inner ring and an outer ring, a combination of ball bearings and roller bearings retained in each raceway, an axle rotatably mounted in the inner rings of each raceway and cooperably rotatable therewith, and a baffle mounted longitudinally along the axle and extending from the axle into the path of fluid flow. Upon rotation of the axle, the baffle restricts or permits fluid flow.

5 Claims, 3 Drawing Sheets

GROUND-BASED POWER GENERATOR WITH BALL-ROLLER BEARING BUTTERFLY VALVE

CROSS-REFERENCE TO RELATED APPLICATIONS

This application claims the benefit of U.S. provisional application No. 60/959,326 filed Jul. 12, 2007, which is hereby incorporated herein by reference, in its entirety.

FIELD OF THE INVENTION

This invention relates to bearings and in particular to bearings for butterfly valves in ground-based power generation systems.

BACKGROUND

A ball-roller bearing comprises an inner ring and an outer ring that define raceways for a combination of roller elements comprising balls and rollers. The travel of the rollers in a ball-roller bearing may be guided by a channel in the outer ring or in the inner ring.

SUMMARY

The present invention resides in one aspect in an improvement in a ground-based power generator that comprises a hot gas valving system that includes a butterfly valve in a gas flow conduit. The improvement comprising that the butterfly valve is mounted in the conduit by a ball-roller bearing.

DETAILED DESCRIPTION OF THE INVENTION

Many ground-based power generation systems, including turbine generator systems, produce hot gases that need to be vented in a controlled manner, and for this purpose, the generation systems include gas flow conduits (such as flues) that are equipped with butterfly valves. A butterfly valve has a valve baffle mounted on axles that extend from opposites sides of the valve baffle and that are mounted on the gas flow conduit. A butterfly valve may be subject to extreme conditions of temperature, pressure, and/or exposure to corrosive chemical species in the gas.

An improved butterfly valve for a hot gas venting system in a ground-based power generation system comprises ball-roller bearings. The ball-roller bearings may enable the axles to pivot with the valve baffle, or they may permit the valve baffle to pivot relative to the axles. Optionally, the ball-roller bearing may be used for a butterfly hot air bleed valve.

There are several possible configurations for a ball-roller bearing as described herein, relating to variations on the location of a guide channel for the roller (whether the inner ring or the outer ring comprises a guide channel, if not both) and whether the rollers are closer to the load zone than the balls, or farther away. In addition, when two ball-roller bearings are used on coaxial axles, the ball-roller bearings may be in face-to-face or back-to-back arrangement.

Figure 1:
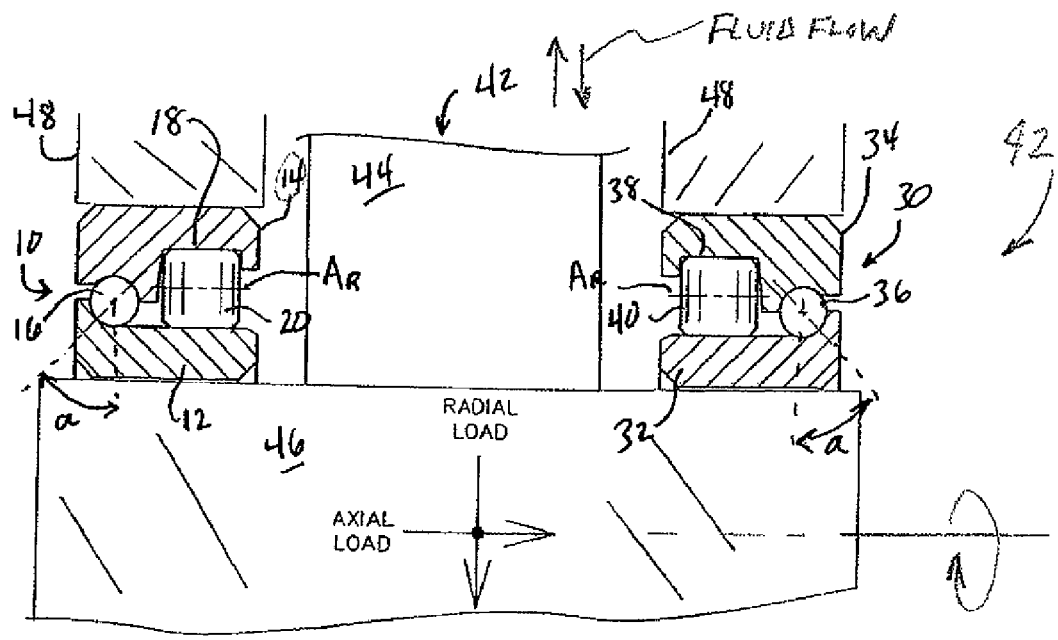
FIG. 1 is a schematic, partly cross-sectional view of a butterfly valve mounted in two ball-roller bearings that are disposed in back-to-back relation to each other with roller guide channels on the outer rings, close to the load zones.

FIG. 1 shows a butterfly valve 42 that comprise a baffle 44 mounted on an axle 46. The axle 46 is mounted in two ball-roller bearings 10, 30, that are mounted in the wall of a hot air bleed conduit 48 of a ground-based power generation system. The expected directions of the axial and radial loads on the bearings are shown by the arrows in the drawing. Ball-roller bearings 10 and 30 are arranged back-to-back with roller guide channels on the outer rings, close to the load zones. Thus, ball-roller bearing 10 comprises an inner ring 12 and an outer ring 14. The inner ring 12 and the outer ring 14 cooperate to define a raceway for a set of balls 16 with contact angles a. The outer ring 14 defines a guide channel 18 for a set of rollers 20. The rollers 20 are disposed in guide channel 18 with their axes of rotation $A_R$ parallel to the axis of rotation of axle 46. Similarly, ball-roller bearing 30 comprises an inner ring 32 and an outer ring 34. The inner ring 32 and the outer ring 34 cooperate to define a raceway for a set of balls 36 with contact angles a. The outer ring 34 defines a guide channel 38 for a set of rollers 40.

Figure 2:
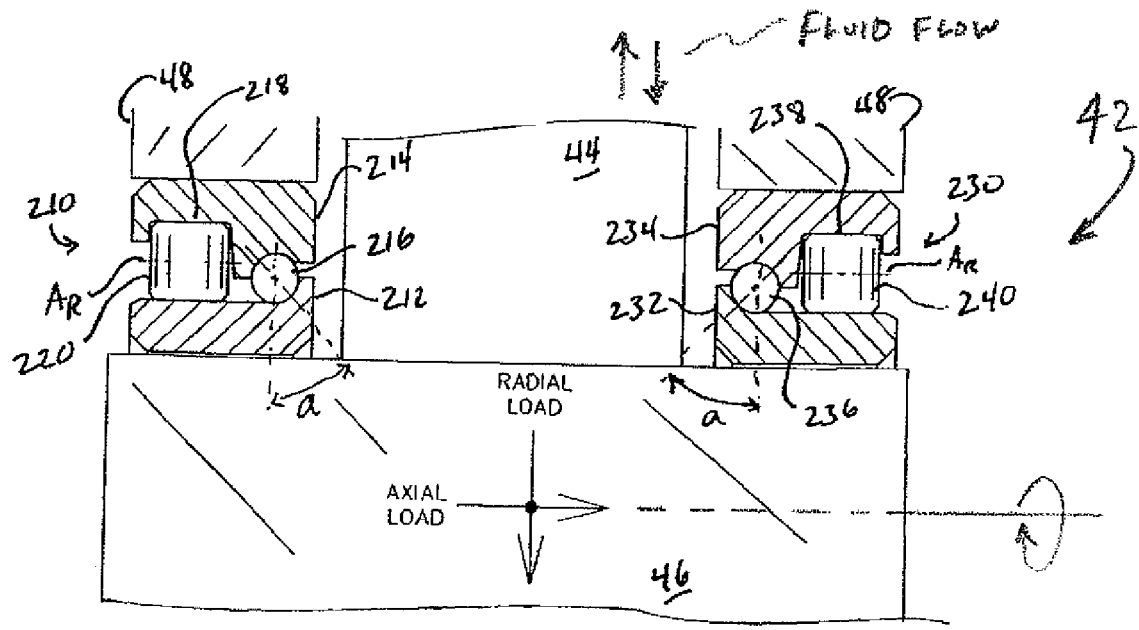
FIG. 2 is a schematic, partly cross-sectional view of a butterfly valve mounted in two ball-roller bearings that are disposed in face-to-face relation to each other with roller guide channels on the outer rings, away from the load zones.

FIG. 2 shows the butterfly valve 42 mounted in two ball-roller bearings 210, 230, that are arranged face-to-face with roller guide channels on the outer rings, away from the load zones. Thus, ball-roller bearing 210 comprises an inner ring 212 and an outer ring 214. The inner ring 212 and the outer ring 214 cooperate to define a raceway for a set of balls 216 with contact angles a. The outer ring 214 defines a guide channel 218 for a set of rollers 220. Similarly, ball-roller bearing 230 comprises an inner ring 232 and an outer ring 234. The inner ring 232 and the outer ring 234 cooperate to define a raceway for a set of balls 236 with contact angles a. The outer ring 234 defines a guide channel 238 for a set of rollers 240.

Figure 3:
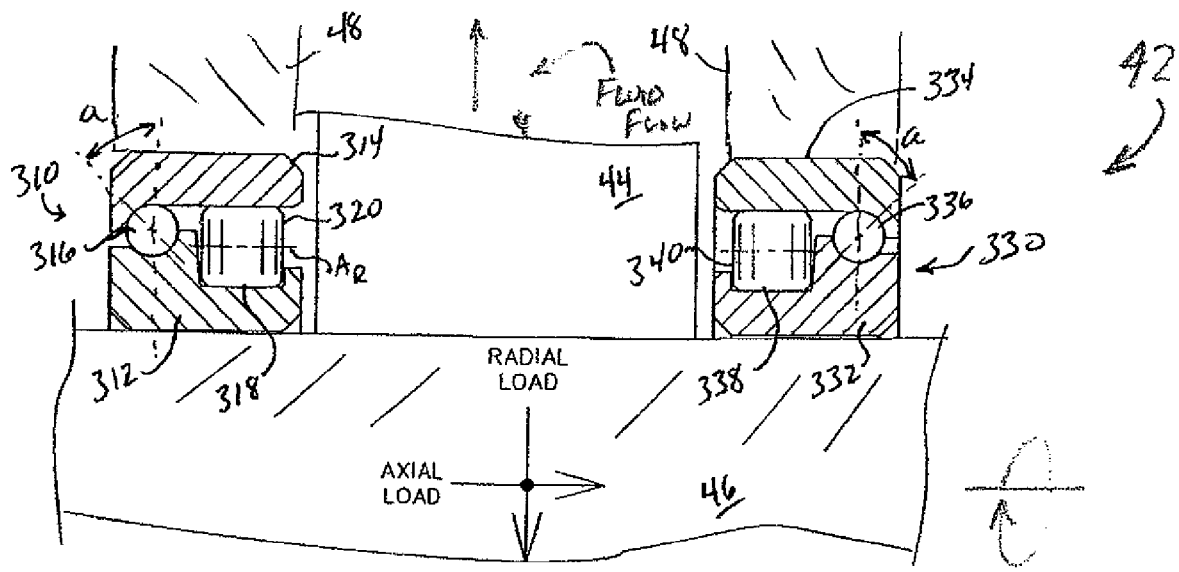
FIG. 3 is a schematic, partly cross-sectional view of a butterfly valve mounted in two ball-roller bearings that are disposed face-to-face relation to each other with roller guide channels on the inner rings, close to the load zones.

FIG. 3 shows the butterfly valve 42 mounted in two ball-roller bearings 310, 312 arranged face-to-face with roller guide channels on the inner rings, close to the load zones. Thus, ball-roller bearing 310 comprises an inner ring 312 and an outer ring 314. The inner ring 312 and the outer ring 314 cooperate to define a raceway for a set of balls 316 with contact angles a. The inner ring 312 defines a guide channel 318 for a set of rollers 320. Similarly, ball-roller bearing 330 comprises an inner ring 332 and an outer ring 334. The inner ring 332 and the outer ring 334 cooperate to define a raceway for a set of balls 336 with contact angles a. The inner ring 332 defines a guide channel 338 for a set of rollers 340.

Figure 4:
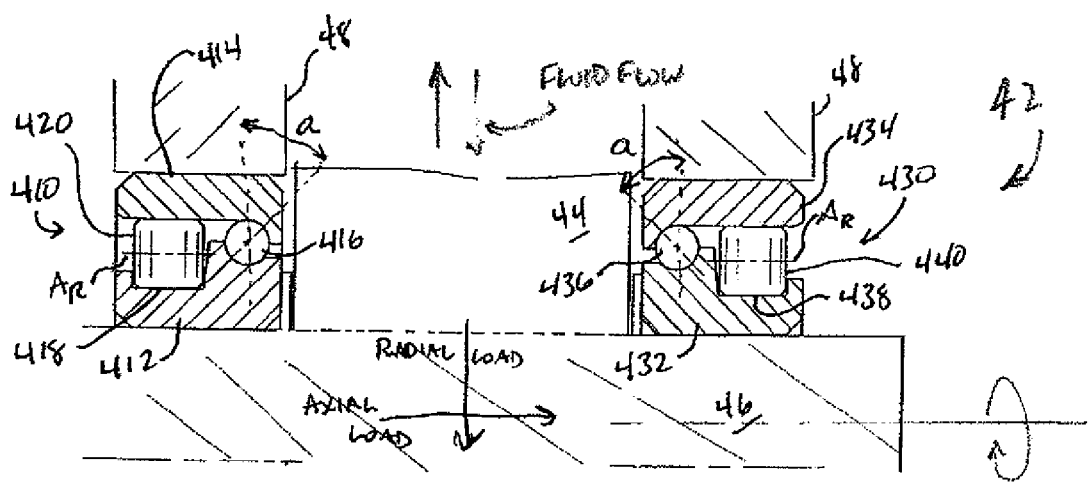
FIG. 4 is a schematic, partly cross-sectional view of a butterfly valve mounted in two ball-roller bearings that are disposed in back-to-back relation to each other with roller guide channels on the inner rings, away from the load zones.

FIG. 4 shows the butterfly valve 42 mounted in two ball-roller bearings 410, 430 arranged back-to-back with roller guide channels on the inner rings, away from the load zones. Thus, ball-roller bearing 410 comprises an inner ring 412 and an outer ring 414. The inner ring 412 and the outer ring 414 cooperate to define a raceway for a set of balls 416 with contact angles a. The inner ring 412 defines a guide channel 418 for a set of rollers 420. Similarly, ball-roller bearing 430 comprises an inner ring 432 and an outer ring 434. The inner ring 432 and the outer ring 434 cooperate to define a raceway for a set of balls 436 with contact angles a. The inner ring 432 defines a guide channel 438 for a set of rollers 440.

In a particular embodiment, a ball-roller bearing for use as described herein may comprise rings and rollers made from a stainless steel alloy such as BG-42, per Aerospace Material Specification AMS 5749. The rings and rollers may bear a thin, dense chrome plate. The balls may be made from silicon nitride ceramic, for example, $Si_3N_4$. In various specific embodiments, such bearings may have one or more of the characteristics set forth in the following Table 1A (in which dimensions are stated in inches, unless otherwise indicated).

TABLE 1A

| | | |
|---|---|---|
| Contact Angle | 40° | [DEG] |
| Preload, Axial | N/A | [LB] |
| Preload, Radial | N/A | [LB] |
| Dynamic Load Rating Radial/Axial (ABMA STD 9) | N/A | [LB] |
| Assembly Identification Marking | MIL-STD-130 | |
| Lubrication | Shipped Dry | |
| Preservation/Packaging | MIL-STD-197 (ITB-4001-PB1) | |
| Bearing Weight | Approx. .35 LB | |
| RINGS | | |
| Material/Specification | BG42/AMS-5749 | |
| Heat Treat Condition/Hardness | HRC 60 MIN. | |
| Shoulder Height, Outer/Inner | 25% Roller/50% Ball (Min) | |
| Raceway Curvature, Inner/Outer | 51.4%/52.4% | |
| ROLLER NUMBER (Nominal Size) | 23 (ø5 mm × 6.5 mm L) | |
| Material/Specification | BG42/AMS-5749 | |
| Heat Treat Condition/Hardness | HRC 60 MIN. | |
| Diameter Variation Per Set | .000100 | |
| BALL NUMBER (Diameter) | 24 (ø³/₁₆") | |
| Material/Specification | $Si_3N_4$/ASTM-F2094, Class II | |
| Heat Treat Condition/Hardness | N/A | |
| Balls Precision Grade (ABMA STD #10) | Grade 24C or Better | |
| SEALS, SHIELDS | N/A | |
| Materials/Specification | N/A | |
| Style | N/A | |

A bearing as in Table 1A may have a diametral clearance (after plating) of about 10 micrometers (um) to about 40 um (about 0.0004-0.0016 in.) for the rollers and about (about 0.0021-about 0.0037 in.) for the balls.

Figure 5:
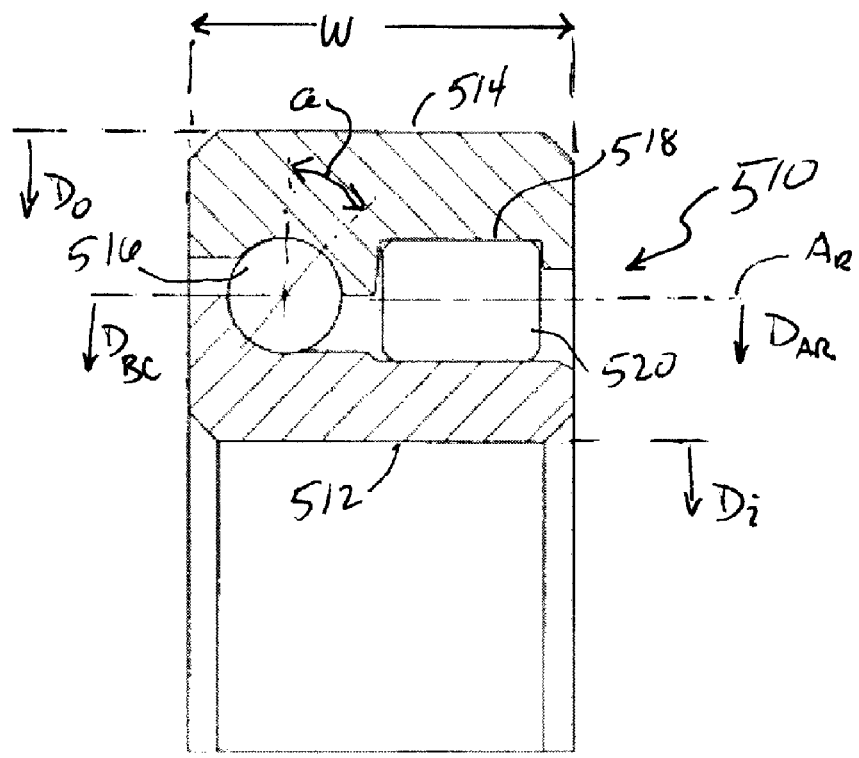
FIG. 5 and FIG. 6 are schematic cross-sectional views of illustrative embodiments of bearings as described herein.
Figure 6:
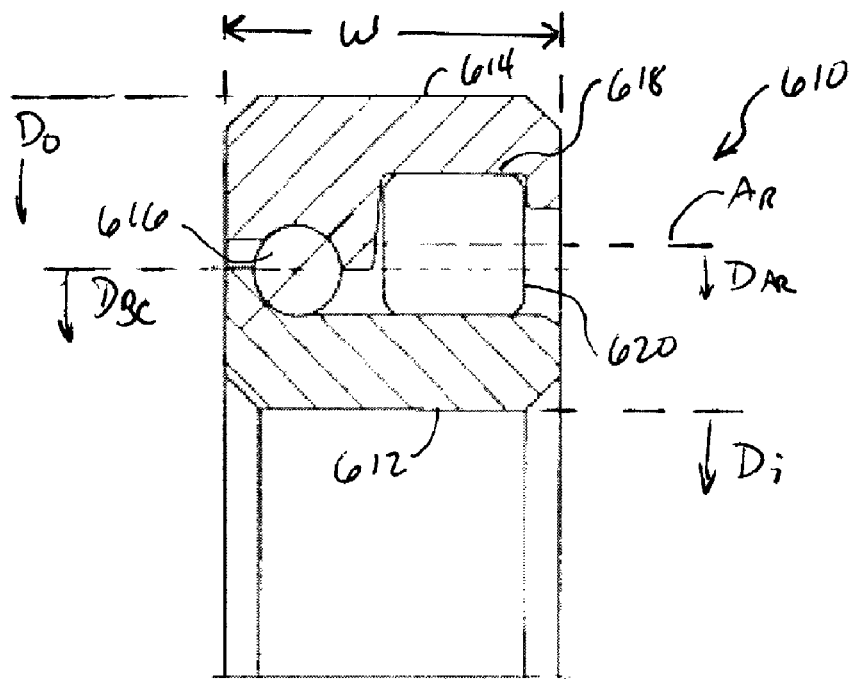

A particular example of a bearing as described by Table 1A is depicted in FIG. 5. Bearing 510 comprises an inner ring 512 and an outer ring 514. The inner ring 512 and the outer ring 514 cooperate to define a raceway for a set of balls 516 with contact angles a. The outer ring 514 defines a guide channel 518 for a set of rollers 520 that have axes of rotation AR. The bearing 510 has an axial width W of about 1.6 cm (about 0.625 in.). The outer ring 514 has an outside diameter $D_o$ of about 2 inches, while the inner ring 514 has an inside diameter Di of about 2.5 cm (about 1 in.). The centers of the balls 516 are disposed in an annual configuration in which their centers disposed along a circle having a diameter $D_{BC}$ of about 3.73 cm (about 1.47 in.), whereas the rollers 520 are disposed in an annular configuration in which their axes of rotation disposed along a cylinder having a diameter $D_{AR}$ of about 3.7 cm (about 1.46 in.).

Bearing 510 is expected to have the following bearing loads carrying capacities (static) as shown in Table 1B, where it is assumed that radial capacities are additive and two bearings will share a total radial load and the axial load may be borne by either bearing:

TABLE 1B

| | Radial | Axial |
|---|---|---|
| Ball row | 6.8 kiloNewtons (kN) (1539 pounds (lbs)) | 28.7 kN (6458 lbs) |
| Roller row | 2.5 kN (5544 lbs) | n/a |
| Per bearing | 3.5 kN (7083 lbs) | 28.7 kN (6458 lbs) |

In other specific embodiments, such bearings may have one or more of the characteristics set forth in the following Table 2A (in which dimensions are stated in inches, unless otherwise indicated).

TABLE 2A

| | | |
|---|---|---|
| Contact Angle | 45° | [DEG] |
| Preload, Axial | N/A | [LB] |
| Preload, Radial | N/A | [LB] |
| Dynamic Load Rating Radial/Axial (ABMA STD 9) | N/A | [LB] |
| Assembly Identification Marking | MIL-STD-130 | |
| Lubrication | Shipped Dry | |
| Preservation/Packaging | MIL-DTL-197 (ITB-4001-PB1) | |
| Bearing Weight | Approx. .062 LB | |
| RINGS | | |
| Material/Specification | BG42/AMS-5749 | |
| Heat Treat Condition/Hardness | HRC 60 Min. | |
| Shoulder Height, Outer/Inner | 25% Roller/50% Ball (Min.) | |
| Raceway Curvature, Inner/Outer | 51.4%/52.4% | |
| Roller Number (Nominal Size) | 19 (ø5 mm × 5 MM L) | |
| Material/Specification | BG42/AMS-5749 | |
| Heat Treat Condition/Hardness | HRC 60 Min. | |
| Diameter Variation Per Set | .000100 | |
| BALL NUMBER (Diameter) | 28 (ø⅛") | |
| Material/Specification | $Si_3N_4$/ASTM-F2094, Class II | |
| Heat Treat Condition/Hardness | N/A | |
| Balls Precision Grade (ABMA STD #10) | Grade 24C or Better | |
| SEALS, SHIELDS | N/A | |
| Material/Specification | N/A | |
| Style | N/A | |

A bearing as in Table 1A may have a diametral clearance (after plating) of up to about 40 um (about 0.0016 in.) for the rollers and about 53 to about 78.7 um (about 0.0021-about 0.0031 in.) for the balls.

In a particular embodiment of a bearing characterized in Table 2A, bearing 610 has an axial width W of about 1.2 cm (about 0.47 in.), an outside diameter Do of about 4.13 cm (about 1.625 in.), and an inside diameter Di of about 1.9 cm (about 0.75 in.). The centers of the balls 616 are disposed in an annual configuration having a diameter $D_{BC}$ of about 1.14 inch, whereas the rollers 620 are disposed in an annular configuration in which their axes of rotation have a radius $D_{AR}$ of about 3 cm (about 1.2 in.).

Bearing 610 is expected to have the following bearing loads carrying capacities (static) as shown in Table 2B, where it is assumed that radial capacities are additive and two bearings will share a total radial load and the axial load may be borne by either bearing:

TABLE 2B

| | Radial | Axial |
|---|---|---|
| Ball row | 3.24 kN (729 lbs) | 16.2 kN (3646 lbs) |
| Roller row | 15.7 kN (3526 lbs) | n/a |
| Per bearing | 18.9 kN (4255 lbs) | 16.2 kN (3646 lbs) |

In other embodiments, the balls, rollers and rings may be made from other materials.

A ground-based power generation system in which a ball-roller bearing-mounted butterfly valve may be used is disclosed in U.S. Pat. No. 5,953,898 to Dryden, dated Sep. 21, 1999, which is hereby incorporated herein by reference. FIGS. 2 and 3 of the Dryden patent show the use of a butterfly valve for controlling hot flue gas flow prior to discharge. The butterfly valve may be equipped with a ball-roller bearing as described herein, as shown in any one of FIGS. 1-4 of this application.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A hot gas valving system for a ground-based power generation system, the hot gas valving system comprising:
   a gas flow conduit having a wall and defining a path for fluid flow; and
   a butterfly valve located in the wall of the gas flow conduit and transversely across the path for fluid flow, the butterfly valve comprising,
   a first raceway defined by an inner ring and a cooperatively associated outer ring,
   a second raceway defined by an inner ring and a cooperatively associated outer ring,
   a combination of ball bearings and roller bearings retained in the first raceway and the second raceway,
   an axle rotatably mounted in the inner rings of the first raceway and the second raceway and cooperably rotatable therewith, and
   a baffle mounted longitudinally along a length of the axle and extending from the axle into the path of fluid flow;
   wherein upon rotation of the axle, the baffle restricts or permits fluid flow; and
   wherein the combination of ball bearings and roller bearings accommodates both an axial load on the axle and a radial load on the axle.

2. The hot gas valving system of claim 1, wherein the combination of ball bearings and roller bearings comprises ball bearings comprising ceramic balls and roller bearings comprising stainless steel rings and rollers.

3. The hot gas valving system of claim 1, wherein the combination of ball bearings and roller bearings comprises ball bearings comprising silicon nitride ceramic and roller bearings comprising rings and rollers made from BG-42.

4. The hot gas valving system of claim 1, wherein the gas flow conduit is a gas bleed conduit.

5. The hot gas valving system of claim 1, wherein a hot gas of the fluid flow comprises air and the gas flow conduit is a hot air bleed conduit.

* * * * *